T. Z. HUMPHRIES.
GARAGE BUILDING.
APPLICATION FILED DEC. 6, 1919.
1,418,714.
Patented June 6, 1922.
3 SHEETS—SHEET 1.
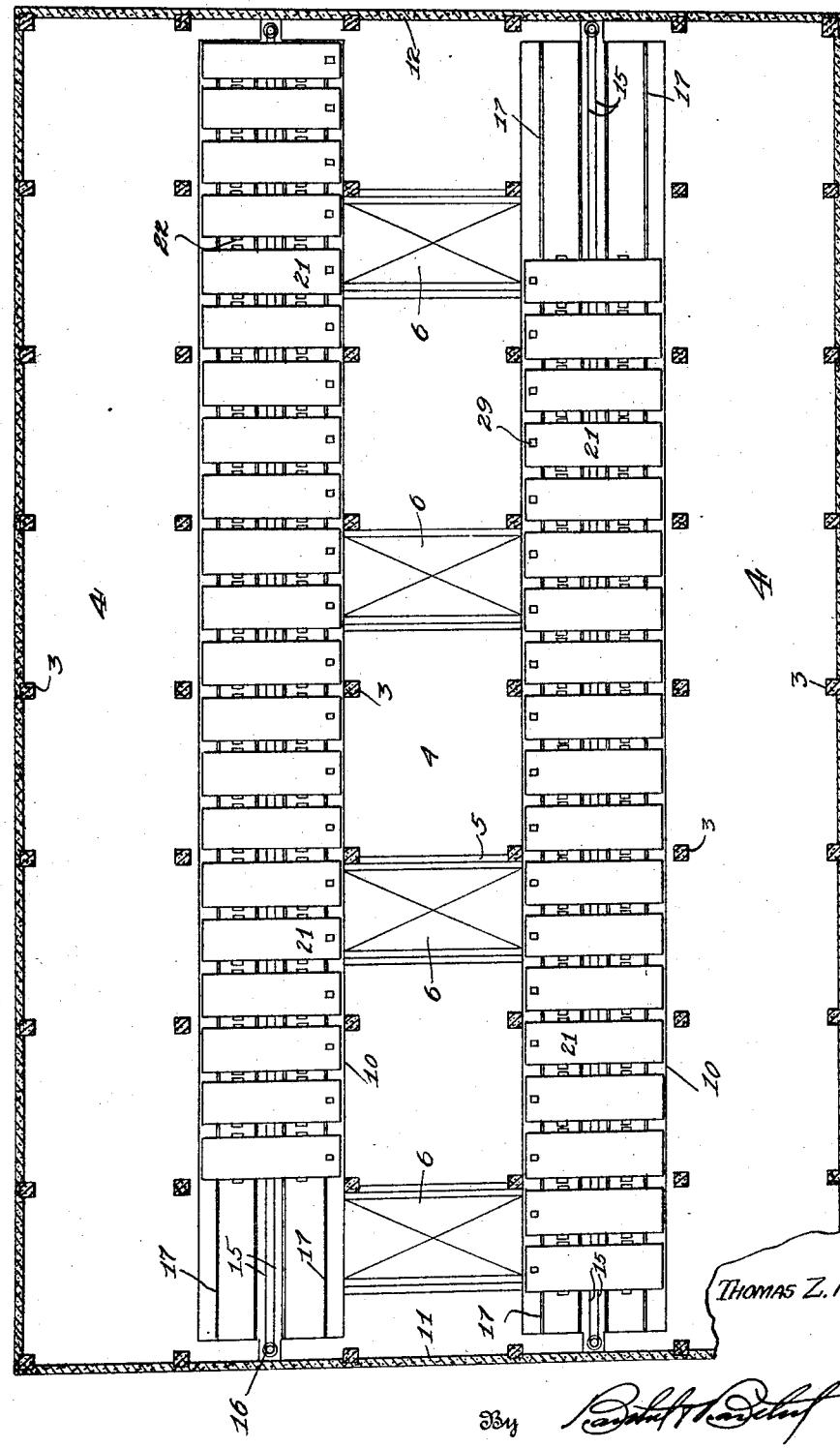
Fig. 1
Inventor
Thomas Z. Humphries
By 
Attorneys

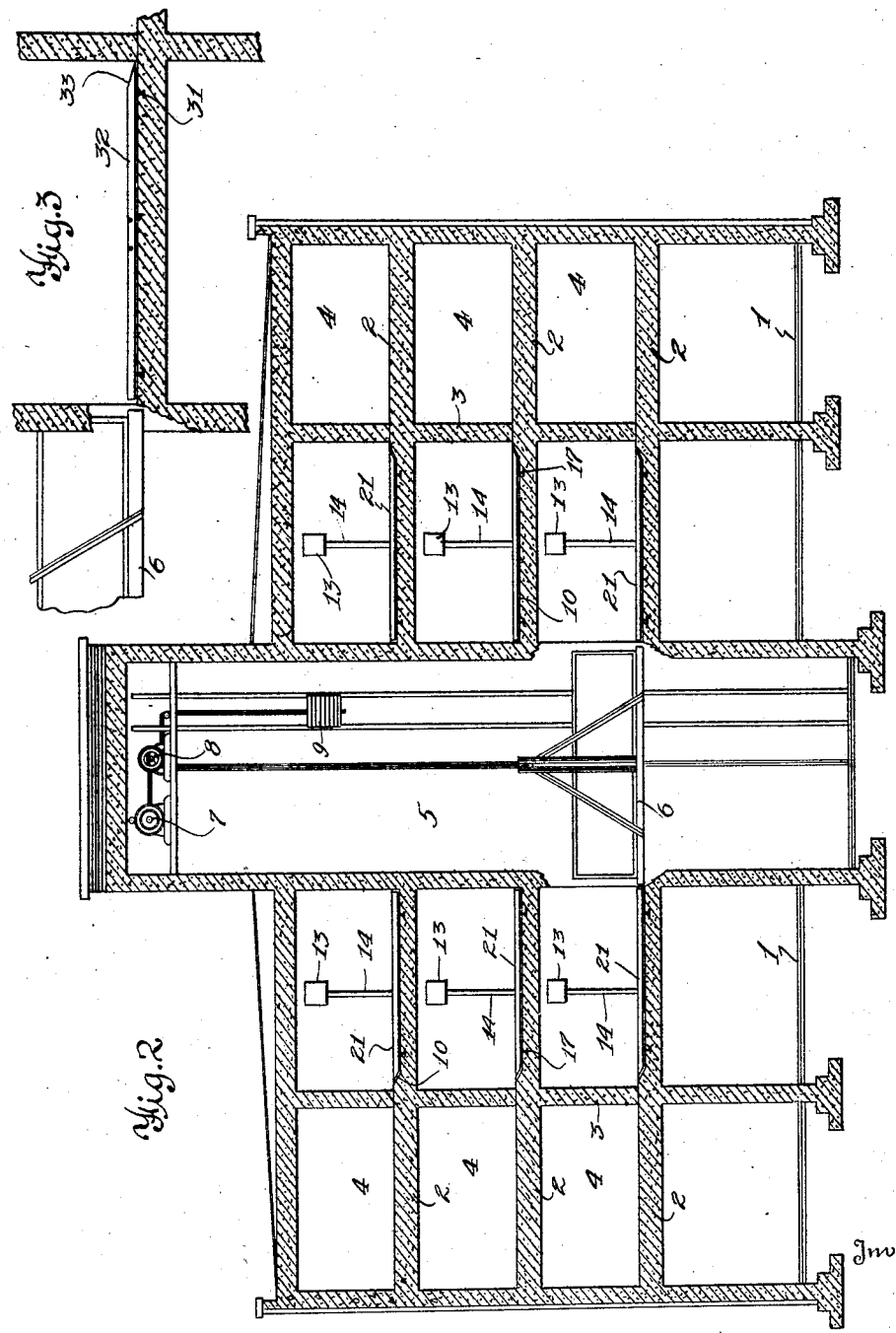

T. Z. HUMPHRIES.
GARAGE BUILDING.
APPLICATION FILED DEC. 6, 1919.
1,418,714.
Patented June 6, 1922.
3 SHEETS—SHEET 3.
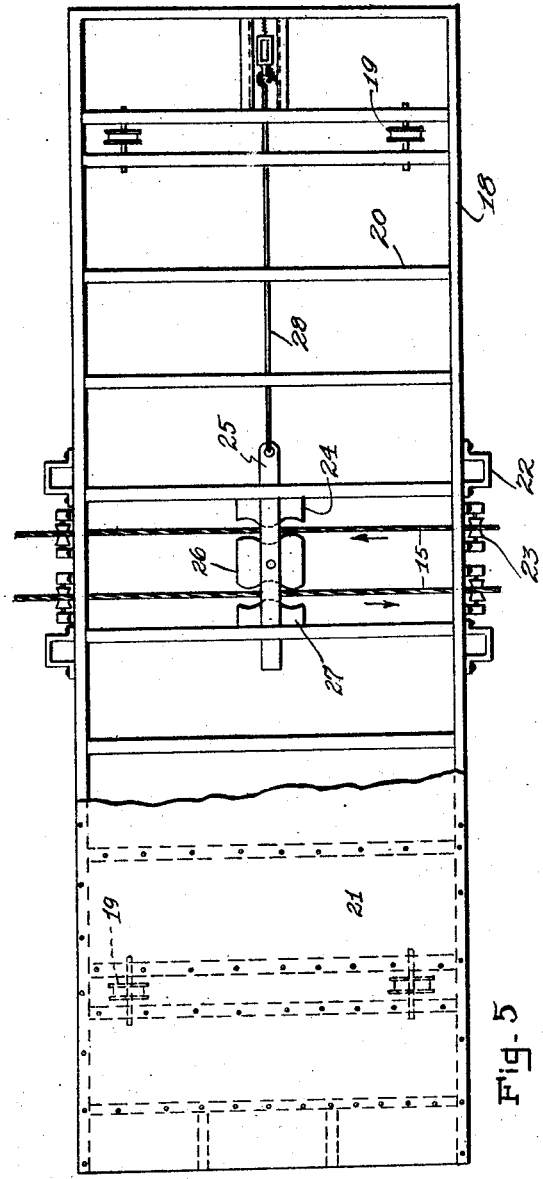
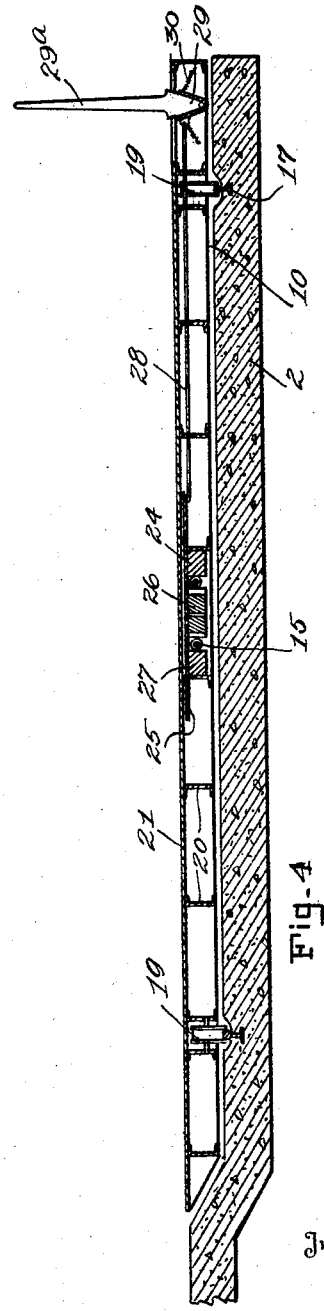
Inventor
Thomas Z. Humphries.

UNITED STATES PATENT OFFICE.

THOMAS Z. HUMPHRIES, OF DETROIT, MICHIGAN.

GARAGE BUILDING.

1,418,714.  Specification of Letters Patent.  Patented June 6, 1922.

Application filed December 6, 1919. Serial No. 342,977.

*To all whom it may concern:*

Be it known that I, THOMAS Z. HUMPHRIES, a citizen of the United States of America, residing at Detroit, in the county of Wayne and State of Michigan, have invented certain new and useful Improvements in Garage Buildings, of which the following is a specification, reference being had therein to the accompanying drawings.

My invention aims to provide a garage or novel building for the storage of vehicles in general, and particularly for the storage of automobiles within the congested districts of large cities, so as to conserve valuable ground space; permit of a paying and safe garage being located adjacent office buildings, and permit of automobiles being expeditiously and economically handled within the garage. It is in this connection that my garage may be characterized in the following particulars:—

First, there is a building that may be made of any size, especially in height, to afford a large floor area and storage capacity for automobiles or other vehicles, and the building is constructed so that it may be readily converted to other uses should it be discontinued as an automobile garage.

Second, vertical and horizontal conveyors are distributed throughout the building structure so that automobiles or matter to be stored may be conveniently handled and easy access had to any stored automobile or matter within the building. The vertical conveyors are in the form of elevators serving the various floors of the building and each floor is provided with horizontal conveyors so that automobiles may be shifted between the storage space and the elevator, and with such a transfer system within the building an owner of an automobile may obtain the same without delay.

Third, the disposal of the horizontal conveyors relative to the storage space is such that automobiles may be expeditiously handled even though there may be some congestion within the building, and the horizontal conveyors are arranged so that automobiles may be independently shifted thereby, thus permitting of the owner of an automobile to manipulate a horizontal conveyor at his convenience without waiting for others.

Fourth, the garage or storage building is designed to occupy a minimum space and afford a maximum capacity for automobiles, and in consequence of the compact structural arrangement of the building there are numerous features, which will hereinafter appear, that contribute to a safe and quick handling of storage matter.

Reference will now be had to the drawings, wherein

Figure 1 is a horizontal sectional view, partly broken away, of a building in accordance with this invention;

Fig. 2 is a vertical cross sectional view of the same;

Fig. 3 is a detail sectional view illustrating a slight modification of my invention;

Fig. 4 is a cross sectional view of a portion of the building floor showing a portion of the horizontal conveyors or movable platforms in longitudinal section, and Fig. 5 is a plan, partly broken away, of one of the horizontal conveyors or movable platforms.

As pointed out in the beginning, the building may be made of any size, particularly in height, but it has been found advisable to make the building rectangular in plan, fire proof throughout and with as many ground entrances as thoroughfares will permit. However, I do not confine my invention to the precise plans or arrangements for handling automobiles other than defined by the appended claims.

Considering the preferred form of building there is a ground floor 1 that may be either utilized for storage purposes or for offices or outside stores, and superimposed floors 2 available for the storage of automobiles or various kinds of merchandise. The superposed floors 2 may be safely supported by a multiplicity of columns 3, and said columns are distributed throughout the building so that the superposed floors may support considerable weight. The arrangement of the columns is also such as to divide each floor into substantially rectangular compartments 4 and not materially interfere with manipulation of automobiles on each floor, the majority of the compartments 4 being located at the side walls of the building while others are located centrally thereof and some occupied by the horizontal conveyors or movable platforms to be hereinafter considered.

In the building are a plurality of vertical conveyors or elevators 6 arranged in wells 5 suitably spaced between the walls of the building, and for the purpose of this application there are shown four elevators with some of the compartments 4 between the elevator wells 5. The elevators 6 may be of a conventional form and each of sufficient size for carrying an automobile, but it is preferable to have the elevator electrically operated, for instance, by a motor 7, a hoist 8, a counterbalance 9 and suitable switches or controlling devices located at each elevator well on each floor, so that the owner of an automobile or an attendant of the building may at all times operate one of the elevators. Of course safety gates and other appliances, not forming any part of my invention, will be included in the elevator equipment of the building.

Those superposed floors 2 bordering on the elevator well 5 are provided with countersunk portions or recesses 10 extending throughout the length or breadth of each floor, and assuming the building to have a front wall 11 and a rear wall 12, and either of said walls is provided with electric motors 13 for operating vertical shaft 14 adapted to impart movement to endless conveyors 15 movable over suitable sheaves of pulleys 16 at the ends of each of the recesses 10. The conveyors 15 may be in the form of cables, chains or other flexible members which will afford two strands, one traveling in one direction and one in the other when movement is imparted to each conveyor from its electric motor, and said motors will be controlled from a point adjacent each elevator well in each floor, so that the owner of an automobile or an attendant of the building may place a conveyor in operation without leaving the elevator station. This will obviate considerable walking especially in a building of large area.

In each of the floor recesses 10 is a longitudinal track composed of rails 17 suitably anchored in the floor 2, and shiftable on the track of each recess is a multiplicity of parallel and closely arranged horizontal conveyors or movable platforms, best shown in Figs. 1, 4 and 5.

Each movable platform may be made of standard structural steel or other material to provide an oblong frame 18 having transverse members 20. Within some of said members are supporting trucks or wheels 19 adapted to travel on the rails 17 without any danger of the platform being derailed. The frame 18 and the transverse members 20 support a platform or floor 21 flush with the floor 2, and the longitudinal side of each frame 18 has bumpers or cushion members 22 and guide sheaves or anti-frictional rollers 23 for the strands of the conveyor 15, said conveyor extending through suitable openings in the frame 18 intermediate the ends thereof.

The intermediate transverse members 20 of each frame support stationary clutch members 24 and 27 and a slide bar 25 provided with an intermediate movable clutch member 26 which may cooperate with either of the stationary clutch members 24 and 27 in gripping the strands of the conveyor 15. For instance, the clutch members 24 and 26 may cooperate to grip the conveyor 15 and shift the platform 21 in one direction, and the clutch members 26 and 27 may grip the conveyor to shift the platform in an opposite direction. To adjust this clutch member 26 relative to either of the clutch members 24 or 27 the slide bar 25 is connected by a rod 28 to a pivoted lever socket 29 at one end of the platform 21, although it is possible to provide a lever socket at each end for the convenience of an operator.

Each lever socket 29 is retained in a neutral position by coiled springs 30 connected thereto, and it is obvious that these springs may be associated with the slide bar 25 to serve the same purpose, namely that of maintaining the movable clutch member 26 in a central position relative to the strands of the conveyor, so that the conveyor may freely operate independent of the platform, particularly while other platforms are being shifted. The pivoted lever socket 29 is adapted to receive a detachable lever or member 29$^a$ so that the clutch of each platform may be actuated when it is desired to have the conveyor shift the platform. The pivoted lever sockets are preferably located at the inner ends of the platforms 21, and with the levers or members removed from the sockets it is possible to shift an automobile or other vehicle on to the platform, either from the elevator 6 or from compartments between the elevators it being apparent by an inspection of Fig. 1 that easy access may be had to all of the side compartments 4.

Should it be desired to construct the building so that it may be used for other purposes than that of automobile storage, the floors 2 adjacent the elevator may be constructed in the usual manner and rails 31 embedded in the floor or laid thereon for platforms 32, as shown in Fig. 3. The platforms 32 may have beveled or inclined ends 33 so that automobiles may readily move on to and off of the platform, and the stopping of the elevator 6 may be regulated so that said elevators will be in the same plane as the platforms 32 and thus permit of vehicles being readily moved back and forth between the elevators 6 and the movable platforms 32. Then again, it is possible to cover the floors 2 of the compartment 4 with tiling or any suitable material that will serve as a superfloor thus placing the floors of the compartment 4 on the same level as the platforms 32. Should the building be converted to other uses the superfloors may be readily removed.

Considering Fig. 1, it will be noted that two rows of movable platforms serve the elevators 6; that the combined area of three of the platforms is approximately the equivalent of the floor area of one of the compartments 4; that in each of the recesses 10 there is available space for shifting the movable platforms so that a nearby selected platform may be shifted to its nearest elevator and that an elevator is approximately the area of two of the movable platforms. In other words, every available foot of floor space is utilized for the manipulation of automobiles and for storage purposes, and assuming that an automobile enters the building and is driven on to one of the elevators in the ground floor, the chauffeur of the automobile or the attendant of the building starts the elevator to a desired floor where there is available storage space or a compartment rented by the chauffeur of the automobile. The elevator is brought to a stop at the desired floor and if there is no available empty platform at the loaded elevator, the chauffeur or attendant immediately starts one of the conveyors 15 and then steps on to one of the platforms and manipulates the lever to operate the clutch of the platform to move the platform in a desired direction. Should the platform be loaded it and adjoining platforms may be shifted until an empty platform arrives at the elevator, when the automobile may be run on to the empty platform and then the platform shifted to a compartment where the automobile is to be stored. By clutching one of the platforms to the endless driven conveyor 15 adjacent platforms may be pushed by the clutched platform, and it is obvious that the platforms may be used as storage space, particularly when an automobile is temporarily left at the garage.

It is thought that the utility of my garage will be apparent without further description, and I would have it understood that a power plant may be located within the building for operating the vertical and horizontal conveyors; that my invention is not limited to the mechanical means for operating or controlling the conveyors, and that the invention is otherwise susceptible to such variations and modifications as fall within the scope of the appended claims.

What I claim is:—

1. In a storage building, superposed floors, elevators arranged in a central longitudinal vertical plane of the building to reach said floors and serve either side of the building, and independently operated platforms adjacent said elevators and shifted laterally of said floors and capable of serving any one of the elevators.

2. In a storage building as characterized in claim 1, the platforms being closely arranged in rows with platform operating means for each row.

3. In a storage building, superposed floors, elevators to reach said floors, and independently operated platforms disposed side by side and countersunk in the floors with groups of said platforms having a limited lateral movement transverse to the exit of each elevator.

In testimony whereof I affix my signature in the presence of two witnesses.

THOMAS Z. HUMPHRIES.

Witnesses:
KARL H. BUTLER,
ANNA M. DORR.